(12) United States Patent
Bagheri et al.

(10) Patent No.: US 11,317,411 B2
(45) Date of Patent: Apr. 26, 2022

(54) METHOD AND APPARATUS FOR DECODING A PDSCH USING PRE-EMPTION

(71) Applicant: Lenovo (Singapore) Pte. Ltd., New Tech Park (SG)

(72) Inventors: Hossein Bagheri, Urbana, IL (US); Hyejung Jung, Northbrook, IL (US); Vijay Nangia, Woodridge, IL (US); Khalid Zeineddine, Evanston, IL (US); Tyler Brown, Lake Zurich, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 87 days.

(21) Appl. No.: 16/791,966

(22) Filed: Feb. 14, 2020

(65) Prior Publication Data

US 2020/0267713 A1 Aug. 20, 2020

Related U.S. Application Data

(60) Provisional application No. 62/806,724, filed on Feb. 15, 2019.

(51) Int. Cl.
*H04W 72/04* (2009.01)
*H04L 5/00* (2006.01)

(52) U.S. Cl.
CPC ......... *H04W 72/046* (2013.01); *H04L 5/0044* (2013.01); *H04L 5/0053* (2013.01); *H04W 72/048* (2013.01)

(58) Field of Classification Search
CPC . H04W 72/04; H04W 72/046; H04W 72/048; H04L 5/0044; H04L 5/0053
See application file for complete search history.

(56) References Cited

U.S. PATENT DOCUMENTS

2018/0270800 A1* 9/2018 Park ................... H04W 72/042
2018/0279326 A1 9/2018 Park
(Continued)

FOREIGN PATENT DOCUMENTS

WO 2018185995 10/2018

OTHER PUBLICATIONS

3GPP, 3rd Generation Partnership Project; Technical Specification Group Radio Access Network; NR; Radio Resource Control (RRC) protocol specification (Release 15), 3GPP TS 38 331 V15.4.0 (Dec. 2018), Valbonne—France.
(Continued)

*Primary Examiner* — Chandrahas B Patel
(74) *Attorney, Agent, or Firm* — Loppnow & Chapa; Matthew C. Loppnow

(57) ABSTRACT

At least two PDSCH resource allocations can be received. Different PDSCH resource allocations of the at least two PDSCH resource allocations can be associated with different spatial filters for a UE. A pre-emption indication that indicates pre-empted resources can be received. A determination can be made as to whether the pre-emption indication is applicable to a first PDSCH resource allocation, a second PDSCH resource allocation, both PDSCH resource allocations, or no PDSCH resource allocation of the at least two PDSCH resource allocations. A first PDSCH corresponding to the first PDSCH resource allocation can be decoded based on no transmission being present for the UE in the pre-empted resources in response to determining the pre-emption indication is applicable to the first PDSCH resource allocation and not applicable to the second PDSCH resource allocation.

20 Claims, 4 Drawing Sheets

(56) References Cited

U.S. PATENT DOCUMENTS

| | | | |
|---|---|---|---|
| 2019/0222284 A1* | 7/2019 | Huang | H04L 5/0053 |
| 2019/0394772 A1* | 12/2019 | Li | H04W 72/1289 |
| 2020/0119895 A1* | 4/2020 | Choi | H04W 76/27 |
| 2020/0205059 A1* | 6/2020 | Khoshnevisan | H04W 48/12 |
| 2021/0058937 A1* | 2/2021 | Islam | H04L 5/0048 |

OTHER PUBLICATIONS

3GPP, 3rd Generation Partnership Project; Technical Specification Group Radio Access Network; NR; Physical layer procedures for control (Release 15), 3GPP TS 38 213 V15.3.0 (Sep. 2018), Valbonne—France.

3GPP, 3rd Generation Partnership Project; Technical Specification Group Radio Access Network; NR; Physical layer procedures for data (Release 15), 3GPP TS 38.214 V15.3.0 (Sep. 2018), Valbonne—France.

Samsung, Evaluation results of superposition scheme in case of multiplexing eMBB and URLLC, R1-1609058, 3GPP TSG RAN WG1 Meeting #86bis, Lisbon, Portugal, Oct. 10-14, 2016.

3GPP, 3rd Generation Partnership Project; Technical Specification Group Radio Access Network; NR; Multiplexing and channel coding, (Release 15), 3GPP TS 38.212 V15.4.0 (Dec. 2018).

Sorrentino, International Search Report, International Application No. PCT/IB2020/051285, European Patent Office, Rijswijk, NL, dated May 6, 2020.

\* cited by examiner

METHOD AND APPARATUS FOR DECODING A PDSCH USING PRE-EMPTION

BACKGROUND

1. Field

The present disclosure is directed to a method and apparatus for decoding a Physical Downlink Shared Channel (PDSCH) using pre-emption.

2. Introduction

Presently, wireless communication devices, such as User Equipment (UE), communicate with other communication devices using wireless signals. Fifth Generation (5G) wireless systems are expected to provide connectivity for a wide range of applications. 3GPP follows this vision where the 5G New Radio (NR) design considers three different service categories: enhanced Mobile Broadband (eMBB) addressing human-centric use cases for access to multimedia content, services and data, massive Machine Type Communications (mMTC) for a very large number of connected devices typically transmitting a relatively low volume of non-delay-sensitive data, and Ultra-Reliable Low-Latency Communications (URLLC) with strict requirements, in terms of latency and reliability. This is aligned with the International Telecommunication Union (ITU) requirements for the International Mobile Telecommunications (IMT) 2020 standard.

In Third Generation Partnership Project (3GPP), the performance target for URLLC transmission for control plane latency is 10 ms, and it is 0.5 ms for user plane latency for downlink and uplink directions, separately. The mobility interruption time is 0 ms for both intra-frequency and inter-frequency handovers for intra-NR mobility. Reliability is defined as success probability of transmitting a predefined number of bytes within a certain delay. The requirement on the latter depends on the usage scenario. For example, the target reliability for the general URLLC case is 99.999% percent with user plane latency of 1 ms and payload size of 32 bytes.

For efficient utilization of resources, URLLC traffic has to be dynamically multiplexed with traditional eMBB traffic. This is a challenging problem since URLLC traffic is bursty and sporadic, and should be scheduled with a short Transmit Time Interval (TTI) in order to fulfil the latency requirement, whereas eMBB traffic requires longer TTIs allowing lower signaling overhead.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for communicating on a wireless network. According to a possible embodiment, at least two PDSCH resource allocations can be received. Different PDSCH resource allocations of the at least two PDSCH resource allocations can be associated with different spatial filters for a UE. A pre-emption indication that indicates pre-empted resources can be received. A determination can be made as to whether the pre-emption indication is applicable to a first PDSCH resource allocation, a second PDSCH resource allocation, both PDSCH resource allocations, or no PDSCH resource allocation of the at least two PDSCH resource allocations. A first PDSCH corresponding to the first PDSCH resource allocation can be decoded based on no transmission being present for the UE in the pre-empted resources in response to determining the pre-emption indication is applicable to the first PDSCH resource allocation and not applicable to the second PDSCH resource allocation.

Figure 1:
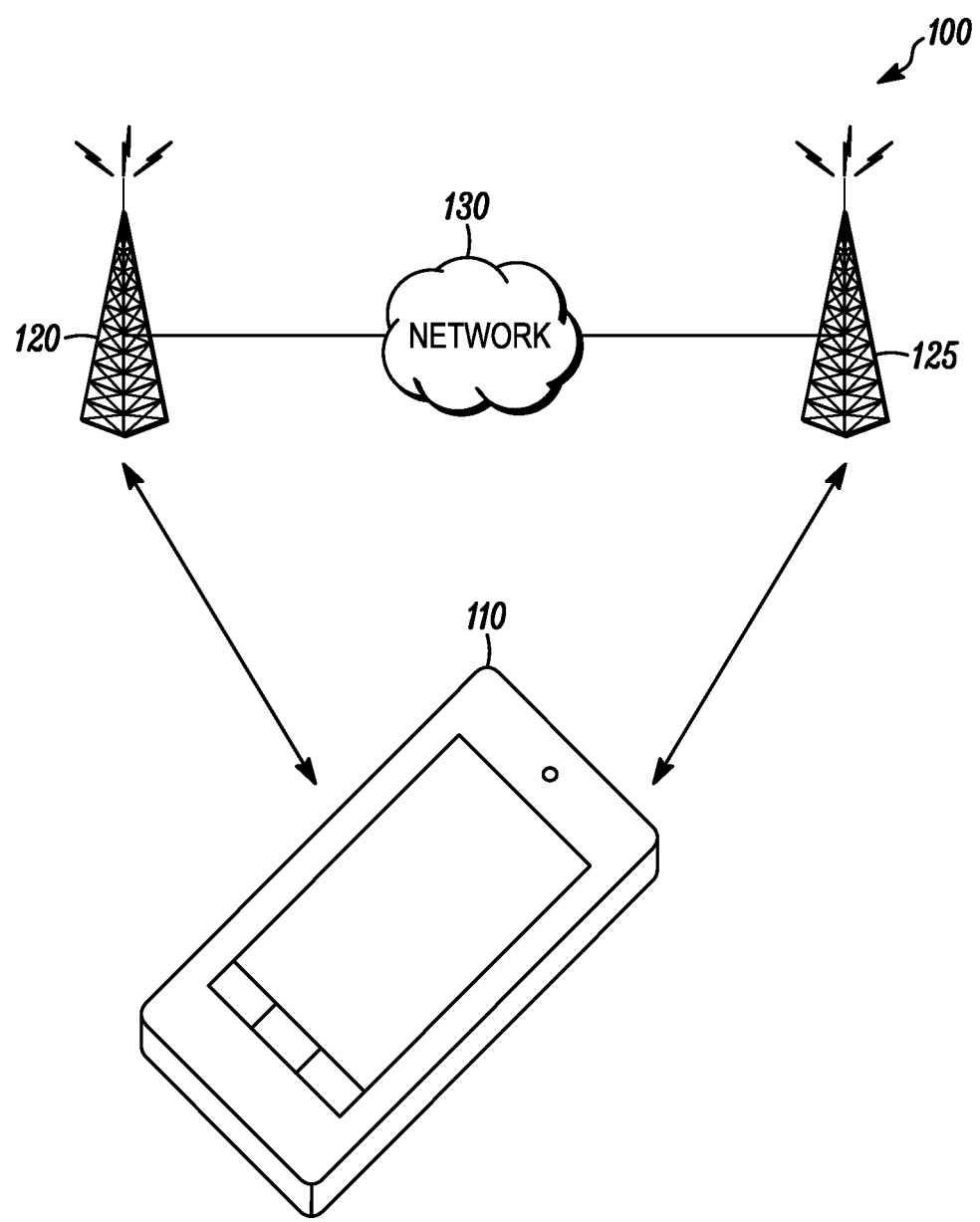
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an Internet of Things (IoT) device, or any other user device that is capable of sending and receiving communication signals on a wireless network. The at least one network entity 120 and 125 can be a wireless wide area network base station, can be a NodeB, can be an enhanced NodeB (eNB), can be a New Radio (NR) NodeB (gNB), such as a Fifth Generation (5G) NodeB, can be an unlicensed network base station, can be an access point, can be a base station controller, can be a network controller, can be a Transmission/Reception Point (TRP), can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3rd Generation Partnership Project (3GPP)-based network, a 5G network, a satellite communications network, a high altitude platform network, the Internet, and/or other communications networks.

In operation, the UE 110 can communicate with the network 130 via at least one network entity 120. For example, the UE 110 can send and receive control signals on a control channel and user data signals on a data channel.

Dynamic multiplexing can be performed between eMBB and URLLC traffic in the Downlink (DL). A UE provided with DownlinkPreemption configuration, can monitor Downlink Control Information (DCI) format 2_1, and upon detection of DCI format 2_1, can find its pre-emption indication using two parameters that can be contained in DCI format 2_1, positionInDCI, and dci-PayloadSize.

Embodiments can address DL pre-emption aspects for multi-Transmission Reception Point (TRP) Physical Downlink Shared Channel (PDSCH) transmission.

For multi-TRP transmission, different TRPs can serve different URLLC traffic or some TRPs may not serve any URLLC traffic at a time, and therefore, different resources may need to be punctured for different eMBB PDSCHs transmitted by different TRPs. Given the coarse frequency indication of existing DL pre-emption indication, PDSCH decoding performance may be degraded if a single pre-emption indication was used to indicate the union of pre-empted resources for all the TRPs scheduling the PDSCHs. For instance, if Demodulation Reference Symbols (DMRSs) sent from different TRPs do not overlap in time and frequency resources to maintain the orthogonality between DMRS ports, applying the same pre-emption indication may lead to puncturing DMRS for a TRP that would have not been punctured if separate pre-emption indications would have been used for different TRPs.

An interrupted downlink transmission indication, also referred to as Downlink Pre-emption Indication (DLPI), downlink cancellation indication, and other similar phrases, can be provided to a UE via a UE-group common DCI signaling so that a network entity can accommodate dynamic multiplexing of URLLC traffics with eMBB traffics in a cell and the UE can properly handle the interrupted downlink transmission. That is, if a UE is configured to monitor a Physical Downlink Control Channel (PDCCH) conveying DCI format 2_1 and detects a DCI format 2_1 for a serving cell from a configured set of serving cells, the UE can assume that no transmission to the UE is present in Physical Resource Blocks (PRBs) and in symbols that are indicated by the DCI format 2_1, from a set of PRBs and a set of symbols of the last monitoring period. Since the interrupted downlink transmission indication is a UE-group common DCI signaling, the network entity, such as a base station, access point, gNB, or other network entity, can configure a group of UEs with the same values for the downlink pre-emption related parameters such as an Interruption Radio Network Temporary Identifier (INT-RNTI), a Control Resource Set (CORESET), PDCCH monitoring occasions, a payload size of DCI format 2_1, and pre-emption indication granularity. Furthermore, the network entity can configure a given bit field in a DCI format 2_1 for more than one UE in order to limit the payload size of the DCI format 2_1, which can reduce the signaling overhead by avoiding a large Control Channel Element (CCE) aggregation level, such as 8 or 16 CCEs, and/or can increase the reliability of UE's PDCCH decoding.

When one or more UEs are configured with the same bit field of pre-emption indication in the DCI format 2_1, all the UEs that are configured with the same bit field of pre-emption indication and detect the DCI format 2_1 can assume that no transmission to the UEs is present in PRBs and symbols indicated by the pre-emption indication in DCI format 2_1. However, in some single-user Multiple Input Multiple Output (MIMO) or multi-user MIMO transmission scenarios, such as multi-TRP transmissions, there can be a case that pre-emption of the PRBs and symbols may be needed only for some spatial layers, some UEs, and/or some PDSCHs. In this case, transmission on other spatial layers, for other UEs, and/or for other PDSCHs, can still be done on the indicated PRBs and symbols with negligible impact on the decoding performance of a pre-empting downlink transmission, such as URLLC PDSCH. Also, for the case of intra-UE multiplexing of eMBB traffics with URLLC traffics, if a UE receiving two overlapping PDSCHs, such as eMBB PDSCH and URLLC PDSCH, is configured to monitor an interrupted downlink transmission indication, such as a DL pre-emption indication, the network entity may only indicate to the UE either that both PDSCHs are interrupted or that none of the PDSCHs are interrupted. This signaling limitation in downlink pre-emption indication may impose unnecessary scheduling restriction to the network entity. For example, the network entity may have to avoid scheduling the one or more UEs configured to monitor the same bit field in the DCI format 2_1 on overlapping time and frequency resources.

A UE can be higher-layer configured with a list of up to M Transmission Configuration Indication (TCI)-State configurations to decode PDSCH intended for the UE in a serving cell, where M can depend on a UE capability. Each TCI-State can contain parameters for configuring a quasi-co-location relationship between one or two Downlink Reference Signals (DL RS) and the DMRS ports of the PDSCH. The quasi co-location relationship can be configured by the higher layer parameter qcl-Type1 for the first DL RS, and qcl-Type2 for the second DL RS, if configured. For the case of two DL RSs, the quasi co-location, also referred to as QCL, types may not be the same, regardless of whether the references are to the same DL RS or different DL RSs. The QCL types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

If a UE is configured with the higher layer parameter tci-PresentInDCI that is set as 'enabled' for the CORESET scheduling the PDSCH, the UE can assume that the TCI field is present in the DCI format 1_1 of the PDCCH transmitted on the CORESET. If tci-PresentInDCI is not configured for the CORESET scheduling the PDSCH or the PDSCH is scheduled by a DCI format 1_0, and the time offset between the reception of the DL DCI and the corresponding PDSCH is equal to or greater than a threshold Threshold-Sched-Offset, where the threshold can be based on a reported UE capability, for determining PDSCH antenna port QCL, the UE can assume that the TCI-State or the QCL assumption for the PDSCH is identical to the TCI-State or QCL assumption whichever is applied for the CORESET used for the PDCCH transmission. If the tci-PresentInDCI is set as 'enabled', the TCI field in DCI in the scheduling component carrier points to the activated TCI-States in the scheduled component carrier or DL Bandwidth Part (BWP) and when the PDSCH is scheduled by DCI format 1_1, the UE can use the TCI-State according to the value of the 'Transmission Configuration Indication' field in the detected PDCCH with DCI for determining PDSCH antenna port QCL. The UE can assume that the DMRS ports of PDSCH of a serving cell are quasi co-located with the Reference Signals RS(s) in the TCI-State with respect to the QCL type parameter(s) given by the indicated TCI-State if the time offset between the reception of the DL DCI and the corresponding PDSCH is equal to or greater than a threshold Threshold-Sched-Offset, where the threshold is based on reported UE capability.

A TRP can schedule UEs dynamically per time interval. For eMBB UEs, the interval can be equal to a slot. The duration of a slot can depend on the subcarrier spacing. Since the number of symbols in a slot can be fixed, higher subcarrier spacing can give a shorter slot. This can be used to support lower-latency transmission, but the cyclic prefix can also shrink when increasing the subcarrier spacing. Thus, this approach may not work in some deployments, such as those with high delay spread. For URLLC UEs, NR can support transmission over a fraction of a slot, starting at any OFDM symbol. This can be called a mini-slot transmission.

However, if a first UE has been scheduled by the gNB with a downlink transmission spanning one slot, and during this transmission, latency-critical data for a second UE arrives at the gNB, then the gNB may have to immediately schedule a URLLC transmission to the second UE. If the gNB is not heavily loaded, and there are frequency resources available, the second UE can be scheduled using these resources that are not overlapping with those of the ongoing transmission to the first UE. However, in the case of a high load in the network, the gNB may end up scheduling the URLLC transmission using some of the resources originally intended for other UEs. In this case, the pre-emption scheme can be used, and the eMBB transmission can be pre-empted by the URLLC transmission. While, in general, a gNB can reserve radio resources for the URLLC data transmissions, such a scheme may be inefficient since URLLC transmissions can be short and sporadic.

The UE whose transmission is being pre-empted can receive symbols contaminated by the URLLC transmission in the overlapping resources of the two transmissions. This can increase the probability of a block decoding error and may ultimately reduce spectral efficiency. To minimize this impact on the eMBB spectral efficiency, such as when just relying on HARQ retransmissions, an indication can be sent to the victim UE and the indication can indicate that part of its transmission has been overwritten. This indication, a pre-emption indicator, can be sent to the victim UE in a slot after the slot containing the PDSCH transmission. The pre-emption indicator can use DCI format 2_1 and can contain a bitmap of 14 bits, as explained in detail below. Furthermore, the monitoring periodicity of the pre-emption indicator can be configured in the device, such as for example, every $n^{th}$ slot. The UE can monitor the DCI format 2_1 with Cyclic Redundancy Check (CRC) scrambled by an INT-RNTI that can be common to multiple devices.

The DownlinkPreemption Information Element (IE) can be used to configure the UE to monitor PDCCH conveying DCI format 2_1 for the INT-RNTI, such as the interruption. The DownlinkPreemption IE can be based on:

may not be applicable to reception of Synchronization Signal (SS)/Physical Broadcast Channel (PBCH) blocks.

A UE can also be provided higher layer parameter monitoringSlotPeriodicityAndOffset that can indicate slots for PDCCH Monitoring configured as periodicity and offset and can corresponds to layer 1 (L1) parameters 'Monitoring-periodicity-PDCCH-slot' and 'Monitoring-offset-PDCCH-slot'.

The UE can also be provided higher layer parameter monitoringSymbolsWithinSlot that can indicate symbols for PDCCH monitoring in the slots configured for PDCCH monitoring. The most significant, such as the left, bit can represent the first OFDM symbol in a slot. The least significant, such as the right, bit can represent the last symbol. The indication can correspond to L1 parameter 'Monitoring-symbols-PDCCH-within-slot'.

If a UE detects a DCI format 2_1 in a PDCCH transmitted in a control resource set in a slot, the set of symbols can be the last $N_{symb}^{slot} \cdot T_{INT} \cdot 2^{\mu-\mu_{INT}}$ symbols prior to the first symbol of the control resource set in the slot. $T_{INT}$ can be the PDCCH monitoring periodicity provided by the value of higher layer parameter monitoringSlotPeriodicityAndOffset. $N_{symb}^{slot}$ can be the number of symbols per slot. $\mu$ can be the subcarrier spacing configuration for a serving cell with mapping to a respective field in the DCI format 2_1. $\mu_{INT}$ can be the subcarrier spacing configuration of the DL BWP where the UE receives the PDCCH with the DCI format 2_1.

If the UE is configured with higher layer parameters TDD-UL-DL-ConfigurationCommon, symbols indicated as uplink by TDD-UL-DL-ConfigurationCommon can be excluded from the last $N_{symb}^{slot} \cdot T_{INT} \cdot 2^{\mu-\mu_{INT}}$ symbols prior to the first symbol of the control resource set in the slot. The resulting number of symbols can be denoted as $N_{INT}$.

Some restrictions can apply. The UE may not expect to be provided values of $\mu$, $\mu_{INT}$, and $T_{INT}$ resulting in a value of $N_{symb}^{slot} \cdot T_{INT} \cdot 2^{\mu-\mu_{INT}}$ that is not an integer. The UE may not expect to be configured by higher layer parameter monitoringSymbolsWithinSlot with more than one PDCCH monitoring occasion for DCI format 2_1 in a slot.

The pre-emption indicator can contain a bitmap of 14 bits. The interpretation of the bitmap can be configurable. In the simplest case, each bit can represent one OFDM symbol in the time domain and the full bandwidth part, or two OFDM symbols in the time domain and one half of the bandwidth part. A UE can be provided the indication granularity for the

```
DownlinkPreemption ::=          SEQUENCE {
    int-RNTI                        RNTI-Value,
    timeFrequencySet                ENUMERATED {set0, set1},
    dci-PayloadSize                 INTEGER (0..maxINT-DCI-PayloadSize),
    int-ConfigurationPerServingCell SEQUENCE (SIZE (1..maxNrofServingCells)) OF INT-
ConfigurationPerServingCell,
    ...
}
INT-ConfigurationPerServingCell ::= SEQUENCE {
    servingCellId                   ServCellIndex,
    positionInDCI                   INTEGER (0..maxINT-DCI-PayloadSize-1)
}
```

An interrupted transmission indication is described in Section 11.2 of TS 38.213. If a UE detects a DCI format 2_1 for a serving cell from the configured set of serving cells, the UE may assume that no transmission to the UE is present in PRBs and in symbols that are indicated by the DCI format 2_1, from a set of PRBs and a set of symbols of the last monitoring period. The indication by the DCI format 2_1 set of PRBs and for the set of symbols by higher layer parameter timeFrequencySet.

If the value of timeFrequencySet is 0, then 14 bits of a field in DCI format 2_1 can have a one-to-one mapping with 14 groups of consecutive symbols from the set of symbols $N_{INT}$. Each of the first $N_{INT} - \lfloor N_{INT}/14 \rfloor \cdot 14$ symbol groups can include $\lceil N_{INT}/14 \rceil$ symbols, and each of the last $14-N_{INT}+\lfloor N_{INT}/14 \rfloor \cdot 14$ symbol groups can include $\lfloor N_{INT}/14 \rfloor$ symbols. A bit value of 0 can indicate transmission to the UE in the corresponding symbol group and a bit value of 1 can indicate no transmission to the UE in the corresponding symbol group.

If the value of timeFrequencySet is 1, then 7 pairs of bits of a field in the DCI format 2_1 can have a one-to-one mapping with 7 groups of consecutive symbols. Each of the first $N_{INT}-\lfloor N_{INT}/7 \rfloor \cdot 7$ symbol groups can include $\lfloor N_{INT}/7 \rfloor$ symbols, and each of the last $7-N_{INT}+\lfloor N_{INT}/7 \rfloor \cdot 7$ symbol groups can include $\lceil N_{INT}/7 \rceil$ symbols. Denoting the set of PRBs in the active DL BWP as $B_{INT}$, a first bit in a pair of bits for a symbol group can be applicable to the subset of first $\lceil B_{INT}/2 \rceil$ PRBs from the set of $B_{INT}$ PRBs, and a second bit in the pair of bits for the symbol group can be applicable to the subset of last $\lfloor B_{INT}/2 \rfloor$ PRBs from the set of $B_{INT}$ PRBs. A bit value of 0 can indicate transmission to the UE in the corresponding symbol group and subset of PRBs, and a bit value of 1 can indicate no transmission to the UE in the corresponding symbol group and subset of PRBs.

Figure 2:
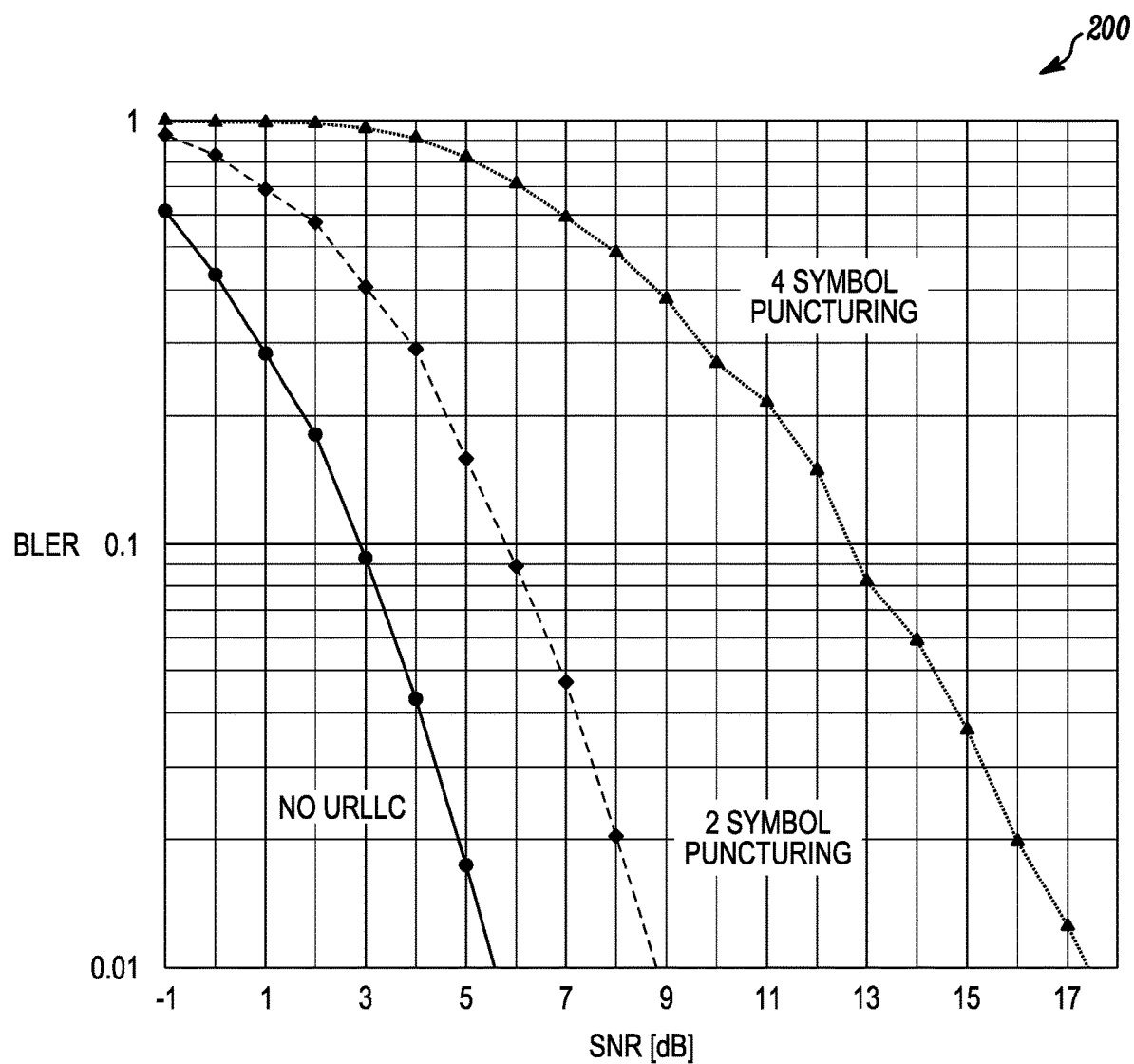
FIG. 2 is an example illustration of Block Error Rate (BLER) performance of eMBB receiver with puncturing information according to a possible embodiment.

FIG. 2 is an example illustration 200 of BLER performance of eMBB receiver with puncturing information according to a possible embodiment. When the total URLLC traffic increases, the pre-emption based multiplexing scheme may have to puncture a lot of eMBB data. For example, there can be a case when there are two URLLC transmissions during the same eMBB transmission, where each URLLC transmission can include 2 OFDM symbols. The gNB may have to puncture eMBB transmission in 4 OFDM symbols to transmit the URLLC signals, and the eMBB performance may get degraded due to the increase of effective code rate, as shown in the illustration 200. This can be true considering PDSCH decoding performance can be degraded if a single pre-emption indication is used to indicate the union of pre-empted resources for all the TRPs scheduling the PDSCHs. Therefore, methods other than previous uses of the DL pre-emption indication for dynamic resource sharing between eMBB and URLLC can be used to decrease the eMBB performance degradation for large URLLC traffics.

In addition to pre-emption, DL dynamic resources sharing between eMBB and URLLC can be supported without pre-emption by scheduling the eMBB and URLLC services on non-overlapping time/frequency resources.

According to at least some embodiments, each pre-emption indication for a TRP can be sent in a separate PDCCH or multiple pre-emption indications for multiple TRPs associated with different TCI-States can be sent using a PDCCH. Multiple pre-emption indications for different UEs can be multiplexed in a single DCI, such as DCI format 2_1, using group common signaling. However, previous techniques may not allow for sending multiple pre-emption indications for different TRPs for a UE.

According to at least some embodiments, a PDCCH can indicate multiple pre-emption indications for different TRPs associated with different TCI states.

Pre-emption indications for different TRPs can be differentiated by adding a field to each pre-emption indication indicated by the PDCCH. The field can be the TCI-State index associated with a TRP PDSCH transmission. Therefore, each pre-emption indication can contain a 14-bit pre-emption indication of punctured resources as well as a bit indication, such as a 6-bit indication, of TCI-state/Synchronization Signal Block (SSB)-index. In a scheduling DCI, a 3-bit TCI field can be present, and before activation of TCI subset via Medium Access Control (MAC) to be used as 8 possible TCI-States in the scheduling DCI from a set of configured TCI-States, 6 bits can be used for TCI-State index/SSB-index indication.

According to a possible embodiment, each pre-emption indication for multi-TRP operation can include 14-bits indicating pre-empted resources as well as a 6-bit TCI-State/SSB-index indicator.

According to a possible embodiment, pre-emption indications for different TRPs can be differentiated in a PDCCH by configuring the UE with a first set of pre-emption indication bits with a first positionInDCI for a first TRP, and a second set of pre-emption indication bits with a second positionInDCI for a second TRP. According to a possible embodiment, the second positionInDCI may not be indicated and the UE can determine the second TRP pre-emption indication bits is the group of bits immediately following the first set of pre-emption indication bits. For example, positionInDCI+1, or positionInDCI+x where x can be a length of pre-emption indication in bits and can be used for determining the second set of pre-emption indication bits for the second TRP. This behavior can be conditioned on the UE configured to receive multi-TRP transmission.

The separate pre-emption indications for different TRPs can be sent in a UE-specific DCI or in a group common DCI. The group common signaling nature of the indication can be kept, at least for small number of TRPs associated with different TCI-States, and a new DCI payload size may also not be introduced.

According to a possible embodiment, group common signaling can be used to indicate separate pre-emption indications for different TRPs associated with different TCI states.

To multiplex pre-emption indications for a new NR release such as NR Release-16 (Rel-16) multi-TRP operation and 14 bit pre-emption indications for Rel-15 UEs in DCI format 2_1, 21 bits, such as a multiple of 7, which is a factor of 14, and/or a multiple of factor of 14, can be used instead of, for example, 20 bits for each pre-emption indication for Rel-16 multi-TRP operation, such as 14-bit pre-emption indication of punctured resources+6-bit indication of TCI-state/SSB-index. The usage of at least one additional bit, such as one bit, can be to determine how many pre-emption indications the UE should read from the detected DCI format 2_1. According to a possible embodiment, the at least one additional bit can be to increase the granularity of the pre-emption indication. For example, it can indicate pre-emption for finer time-frequency resources compared to Rel-15 pre-emption indication time-frequency resources.

According to a possible embodiment, DCI format 2_1 can be re-used, with each pre-emption indication for multi-TRP operation having a bit-field size, such as a 21-bit field size.

Upon detection of a DCI format 2_1, a UE configured with multi-TRP PDSCH transmission, can find its pre-emption indications using positionInDCI, and dci-PayloadSize. If the PDCCH contains a pre-emption indication for a subset of TRPs for the UE, there can be an additional Radio Resource Configuration (RRC) parameter to the DownlinkPreemption configuration to determine how many pre-emption indications from positionInDCI are applicable to the UE.

According to a possible embodiment, a UE can receive an enhanced interrupted downlink transmission indication that can include information of one or more downlink reference signals and one or more time and frequency resources, such as PRBs, symbols, and/or resource elements, where the UE can assume that no transmission to the UE is present for spatial layers, codewords, and/or PDSCHs associated with the indicated one or more downlink reference signals on the indicated one or more time and frequency resources.

According to a possible embodiment, the enhanced interrupted downlink transmission indication can be signaled in a common search space, such as in a group-common PDCCH, and can include indication of one or more SS/PBCH block (SSB) indices. The UE can assume that there is no transmission for the UE that is associated with the indicated SSB, such as spatially quasi-co-located with the indicated SSB or TCI-State of the PDSCH is 'QCL-TypeD' with the indicated SSB, on the indicated time-frequency resource.

According to a possible embodiment, the enhanced interrupted downlink transmission indication can be signaled UE-specifically, such as in a UE-specific PDCCH, and can include information of one or more TCI-States. The UE can assume that there is no transmission for the UE that is associated with the indicated TCI-States on the indicated time-frequency resource.

In possible embodiments with TRP association to DLPI, the pre-empted resources indicated by a DLPI can be applicable to PDSCH allocations associated to a set of TRPs, set of DL RSs, a set of TCI-States, and/or a set of SSB SS/PBCH blocks. In the following embodiments, TRP index can refer to an index to a set of DL RS, such as reference signals, to a set of SS/PBCHs, such as an SSB, and/or to a TCI-State indication.

According to a possible embodiment, the DLPI association to the set of TRPs can be determined based on one or more of different indicators and/or information. The DLPI association to the set of TRPs can also be determined based on the DLPI. For example, a Radio Network Temporary Identifier (RNTI) associated with the received DLPI can indicate for which TRPs of the set of configured TRPs for PDSCH transmission the DLPI is associated with. RRC can define for which TRPs a DLPI with a DLPI configuration received in a CORESET/search space is applicable to. For example, RRC can define DLPI sent in CORESET/search space a can apply to PDSCH allocations signaled in CORESETs/search spaces A, B, and C.

The DLPI association to the set of TRPs can also be determined based on the BWP, such as different search spaces/CORESETs/DL RSs/TCI_States/SSB indices/TRP association to DLPI might be configured/determined based on/for different BWPs. The DLPI association to the set of TRPs can also be determined based on the CORESET/search space in which the DLPI is received.

The DLPI association to the set of TRPs can also be determined based on the number of TRPs/number of configured PDSCH transmissions, such as in a given BWP. For example, for not more than two TRPs, the DLPI can be applicable to both. For example, a single pre-emption indication, such as using a 14-bit indication for punctured resources can be applied to PDSCH transmissions from both TRPs. For more than two TRPs, the DLPI can be applicable to each TRP or a subset of TRPs. For example, a first pre-emption indication, such as using a 14-bit indication for punctured resources, can be applied to a first PDSCH transmission from a first TRP or set of TRPs, and a second pre-emption indication, such as using a 14-bit indication for punctured resources, can be applied to a second PDSCH transmission from a second TRP or set of TRPs.

The DLPI association to the set of TRPs can also be determined based on the number of CORESETs/search spaces in which DLPI is monitored. For example, if DLPI is only monitored in one CORESET/search space, then a pre-emption indication can be applicable to all scheduled PDSCHs for a UE. If DLPI is monitored in at least two CORESETs/search spaces, then a pre-emption indication can be applicable to a subset of scheduled PDSCHs for a UE. Since there may be no concept of TRP index, SSB index for group common signaling or TCI-State indication for UE-specific signaling can be used for spatial-domain pre-emption.

Every TRP out of configured TRPs can sometimes schedule a PDSCH, such as all scheduled PDSCHs can convey the same Transport Block (TB), and that can be taken into account in the DLPI signaling. For example, if a DCI contains multiple DLPI indications associated to different TRPs, a parameter in DLPI can indicate for how many TRPs the DLPI is applicable to. As a further example, a parameter in DLPI can indicate the number of pre-emption indications the UE should read in the DLPI DCI. For instance, in a case of group common signaling, the RRC parameter positioninDCI can indicate the starting position in the DLPI DCI, and a field in the DLPI DCI or other parameter tied to the DLPI DCI, such as the first field where positioninDCI points to, can indicate the number of pre-emption indications the UE reads from the DLPI DCI. Each pre-emption indication can contain an SSB/DL RS/TCI-State indication index field associated to one or more TRPs.

According to a possible embodiment, a UE can receive an enhanced interrupted downlink transmission indication that can include information of one or more downlink reference signals and one or more time and frequency resources, such as PRBs, symbols, and/or resource elements, where the UE can assume that no transmission to the UE is present for spatial layers, codewords, and/or PDSCHs associated with the indicated one or more downlink reference signals on the indicated one or more time and frequency resources.

According to a possible embodiment, the UE can read a pre-emption indication using a first bit-field size if the UE detects the pre-emption indication using a first INT-RNTI. The UE can also read a pre-emption indication using a second bit-field size if the UE detects the pre-emption indication using a second INT-RNTI.

According to a possible embodiment, if the UE detects the pre-emption indication using a first INT-RNTI, then the UE can read a first number of pre-emption indications, such as starting from the pre-emption index determined by position-InDCI. If the UE detects the pre-emption indication using a second INT-RNTI, the UE can read a second number of pre-emption indications, such as starting from the pre-emption index determined by positionInDCI.

According to a possible embodiment, the UE can determine the number of pre-emption indications it should read upon detection of a DLPI, such as a DCI format such as DCI format 2_1, according to the maximum number of configured PDSCH receptions, according to the number of TRPs, and/or according to the number of CORESETs/search spaces for which UE monitors for receiving PDSCHs.

According to a possible embodiment, if the UE is configured with spatial domain pre-emption or multi-TRP operation or DL pre-emption for multi-TRP operation, the UE can assume a pre-emption indication for the UE has a first bit-field size. Otherwise, a pre-emption indication for the UE can have a second bit-field size.

According to a possible embodiment, in a multi-TRP PDSCH transmission, a DCI scheduling a PDSCH associated with a TRP can indicate if a future DLPI is applicable to the PDSCH. For example, a DCI scheduling a PDSCH associated with a TRP can indicate if a future DLPI, such as if a pre-emption indication is received at the end of the slot the PDSCH is scheduled in or beginning of the slot after the slot the PDSCH is scheduled in or a DLPI received at the next DLPI monitoring occasion, is applicable to the PDSCH. This can be useful, for example, if a single pre-emption indication is used for multi-TRP PDSCH operation, and if some of the TRPs do not serve any active URLLC UE/traffic.

According to a possible implementation, a PDCCH can indicate how many pre-emption indications corresponding to different TRPs, such as associated with different TCI-States/SSB-indices, for a UE the PDCCH contains. For example, a field in the PDCCH can indicate a value of how many, such as x, pre-emption indications for the UE, the PDCCH contains. The value x can be indicated from a set of configured/specified/determined values. For example, a one-bit indicator can indicate if the value of x is 1 or 2. In a related embodiment, the value, x, may not be indicated in the DCI but can be a UE capability. In an example, the UE capability of the value x can be different for different transmission parameters, such as BWP, Sub Carrier Spacing (SCS), and/or other parameters.

According to a possible embodiment, a pre-emption indication for UEs configured with multi-TRP operation, such as configured with multiple PDSCH reception via multiple TRPs, referred to as multiTRP_DLPI, can have a different pre-emption indication field size than that of Rel-15, such as 14 bits. For example, each pre-emption indication of multiTRP_DLPI can have a field size higher than that of rel-15, such as 21 bits or a multiple of 7 or 14 bits, such that the new field size can be multiplexed well with the rel-15 pre-emption indications. For example, a group common DLPI with DCI format 2_1, can have a size of 126 bits, and it can be composed of 6 pre-emption indications for Rel-15 UEs of 14 bit each and 2 pre-emption indications for Rel-16 UEs of 21 bit each.

According to a possible embodiment, the parameter positionInDCI for UEs configured with multi-TRP operation, such as configured with multiple PDSCH reception via multiple TRPs, referred to as multiTRP_DLPI, can be a multiple of greatest common divisor of (a) pre-emption indication bit-field size for multi-TRP operation, such as a pre-emption associated with a single TRP of multiple TRPs, such as, 21 bits, and (b) pre-emption indication bit-field size for single-TRP operation, such as when all TRPs are used in Single Frequency Network (SFN) manner or TRPs are transparent to a UE, such as a pre-emption indication bit-field size of 14 bits. Thus, in Rel-15, the parameter positionInDCI can be a multiple of 14. However, in Rel-16 multi-TRP operation, can be multiple of 7, or alternatively, can be multiple of 21, which can be the bit field size of pre-emption indication associated with a TRP.

According to a possible embodiment, if a UE is configured with multi-TRP operation, if the UE PDSCHs transmitted by two TRPs are in different BWP halves, and if a UE receives a DLPI indication with an indication, such as a higher layer parameter indication, of timeFrequencySet set to 1, the 14-bit pre-emption indication as used in rel-15 can be applicable and the UE can determine for which PDSCH the pre-emption indication is applicable as the frequency resources are non-overlapped, and are in different BWP halves.

In an example, if the positionInDCI is not a multiple of 14, or any pre-emption indication length/bit field size for any previous Release, such as Rel-15, which uses 14 bits, upon being scheduled for PDSCH transmissions of different TRPs on different BWP halves, the UE can assume, positionInDCI is rounded to the smaller or larger number that is a multiple of 14 or any pre-emption indication length/bit field size for any previous Rel, such as Rel-15, which uses a length/bit field size of 14 bits.

According to a possible embodiment, the UE can be configured with more than one DLPI configuration, or can be configured with a single DLPI configuration, but some of the parameters of the DLPI configuration can be different corresponding to different TRPs. For example, the UE can be configured with two monitoringSlotPeriodicityAndOffsets, such as, for instance, the search spaces where DLPI is monitored in can have different monitoring periodicities. The UE can also be configured with two INT-RNTIs, with two positionInDCI, and/or with two timeFrequencySets. In another example, DLPI monitoring periodicity can be the same for all TRPs, such as all TRPs the UE is configured to potentially receive simultaneous DL transmission.

At most one DCI with a given RNTI can be expected in a slot, so a gNB may not send two DCI with INT-RNTI in a slot and expect a UE to process both DCIs. For example, if a UE is provided one or more search space sets by corresponding one or more of searchSpaceZero, searchSpaceSIB1, searchSpaceOtherSystemInformation, paging-SearchSpace, ra-SearchSpace, or a CSS set by PDCCH-Config, and a SI-RNTI, a P-RNTI, a RA-RNTI, a SFI-RNTI, an INT-RNTI, a TPC-PUSCH-RNTI, a TPC-PUCCH-RNTI, or a TPC-SRS-RNTI, then, for a RNTI from any of these RNTIs, the UE does not expect to process information from more than one DCI format with CRC scrambled with the RNTI per slot. According to a possible UE implementation, a UE may not look for the second INT-RNTI DCI after receiving the first DCI with INT-RNTI in the slot.

According to a possible embodiment, in case of multi-TRP operation, a UE can expect more than one and up to a number, x, of DCIs with a given RNTI in a slot or mini-slot, so a gNB can send up to x DCI with INT-RNTI in a slot and expect UE to process those DCIs. The number x can be determined based on the number of TRPs, such as a number of configured PDSCH transmissions in multi-TRP operation, the number x can be a higher layer parameter, the number x can be a specified/fixed value, or the number x can be a UE capability.

According to a possible embodiment, the UE may not expect to be configured by higher layer parameter monitoringSymbolsWithinSlot with more than a number, y, of PDCCH monitoring occasions for DCI format 2_1 in a slot. The number y can be determined based on the number of TRPs, such as the number of configured PDSCH transmissions in multi-TRP operation. The number y can be a higher layer parameter, or the number y can be a specified/fixed value, or the number y can be a UE capability.

According to a possible embodiment, if a UE receives an indication of one or more TCI states for which if the UE receives dynamic or semi-persistent scheduling information of PDSCHs associated with the one or more TCI states, the UE shall monitor an interrupted downlink transmission indication for a necessary time duration. If scheduling information of PDSCHs associated with the one or more TCI states is not received, the UE does not monitor the interrupted downlink transmission indication. The indication of the one or more TCI states can be included as part of configuration information for the enhanced interrupted downlink transmission indication.

An implementation based on the above embodiment can include a method at a UE. The method can include receiving at least two physical downlink shared channel resource allocations, where different physical downlink shared channel resource allocations of the at least two physical downlink shared channel resource allocations can be associated with different spatial filters for the user equipment. The method can include determining whether to monitor a control channel with a DCI format associated with pre-emption indication. Monitoring can mean attempting to decode. In response to determining, such as if the UE determines, to monitor a control channel with a DCI format associated with pre-emption indication, receiving a pre-emption indication that indicates pre-empted resources. Further in response to determining to monitor a control channel with a DCI format associated with pre-emption indication, determining whether the pre-emption indication is applicable to a first physical downlink shared channel resource allocation, a second physical downlink shared channel resource allocation, both the first and the second physical downlink shared channel resource allocations, or no physical downlink shared channel resource allocation of the at least two physical downlink shared channel resource allocations. Further in response to determining to monitor a control channel with a DCI format associated with pre-emption indication, decoding a first physical downlink shared channel corresponding to the first physical downlink shared channel resource allocation based on no transmission being present for the UE in the pre-empted resources in response to determining the pre-emption indication is applicable to the first physical downlink shared channel resource allocation and not applicable to the second physical downlink shared channel resource allocation. The method can also include determining to monitor the control channel based on at least one of the at least two PDSCH resource allocations associated with a TCI state/spatial filter of a predetermined set of TCI states/spatial filters.

According to a possible embodiment related to intra-UE multiplexing, a UE can receive an indication of whether the UE has to cancel reception and decoding of a first PDSCH, via a PDCCH or a DCI format scheduling a second PDSCH, where the first and second PDSCHs can have fully or partially overlapping time and frequency resources. The first PDSCH can be dynamically scheduled by another PDCCH different than the PDCCH scheduling the second PDSCH or semi-statically scheduled by higher-layer signaled downlink Semi-Persistent Scheduling (SPS) configuration or configured grant configuration and possibly a DCI based activation/deactivation command, such as for configured grant type 2 addressed to CS-RNTI. The PDCCH scheduling the first PDSCH can be received earlier than the PDCCH scheduling the second PDSCH.

According to another possible embodiment, the UE can determine cancellation of reception/decoding of the first PDSCH in response to receiving the PDCCH that schedules the second PDSCH based on TCI states of the first and second PDSCHs. The first and second PDSCHs can have fully or partially overlapping time and frequency resources. In one example, the TCI state of the first PDSCH can be different from the TCI state of the second PDSCH and the UE can decode the first PDSCH and second PDSCH and generate HARQ-ACK feedback information for the first PDSCH and second PDSCH. Otherwise, when the TCI state of the first PDSCH is same as the TCI state of the second PDSCH, the UE can cancel the decoding of the first PDSCH.

According to a possible embodiment, a set of TCI-States for which the UE can receive and decode corresponding PDSCHs on partially or fully overlapped resources can be dynamically indicated, such as via a MAC Control Element (CE).

According to a possible embodiment for Rate-matching/pre-emption indication for DL SPS operation, for Time-Synchronized-Network (TSN) traffic, where traffic can be deterministic and periodic, a UE scheduled to receive eMBB traffic can receive an indication indicating that a rate-matching or pre-emption for a set of resources, such as set of DL SPS or configured grant resources given to a TSN UE, is applicable to its current and future PDSCH transmissions that may overlap with the indicated set of resources, such as until such an indication is de-activated. In an example, a higher layer command, such as a MAC-CE or RRC command, or a DCI, such as similar to a SPS activation command, can activate a rate-matching pattern/pre-emption indication to a UE, such as a UE using eMBB. The UE, once scheduled with PDSCH or if using configured grant/SPS, applies/considers the rate-matching/pre-emption indication for decoding every PDSCH it receives until the UE receives an indication that the rate-matching/pre-emption indication is de-activated, such as via MAC-CE or RRC or DCI signaling. In an example, such a rate-matching/pre-emption indication similar to SPS activation can include the resources that the eMBB UE may use to rate-match/puncture around.

According to a possible implementation, an eMBB UE can be configured with multi-TRP PDSCH reception, and each TRP can have its own rate-matching/pre-emption indication applicable to multiple PDSCH scheduling time instances, and the UE can receive an activation/de-activation command for such a rate-matching/pre-emption indication corresponding to each TRP or set of TRPs.

According to a possible embodiment, if DL SPS resources are configured for URLLC, an eMBB UE can be opportunistically scheduled on resources overlapping with the DL SPS resources when there is no transmission for URLLC. The eMBB UE's pre-emption indication monitoring can be activated or deactivated based on activation/deactivation of the DL SPS resources.

Figure 3:
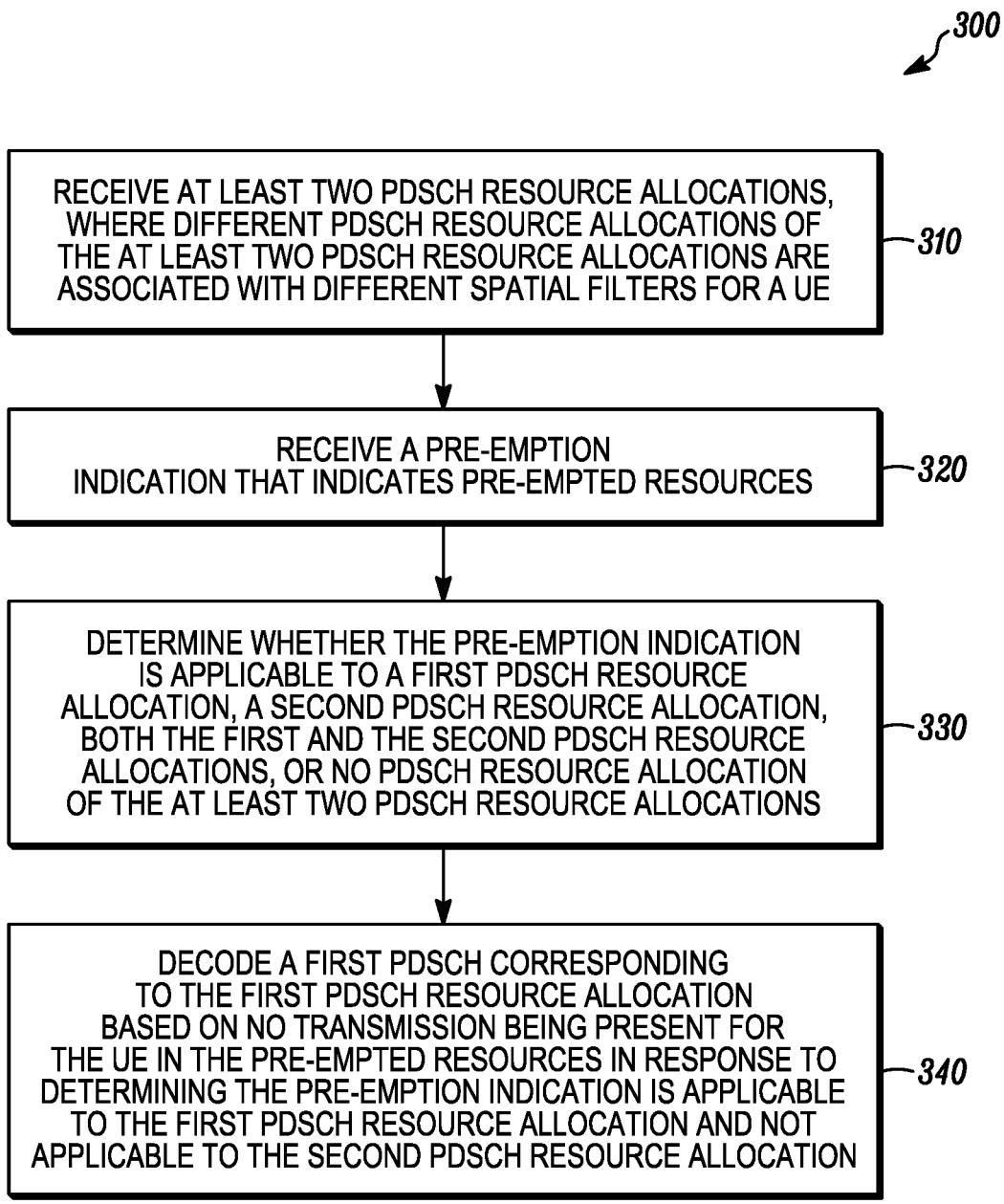
FIG. 3 is an example flowchart illustrating the operation of an apparatus according to a possible embodiment.

FIG. 3 is an example flowchart 300 illustrating the operation of a wireless communication device, such as the UE 110, according to a possible embodiment. At 310, at least two PDSCH resource allocations can be received. The at least two PDSCH resource allocations can be received in at least one DCI. Different PDSCH resource allocations of the at least two PDSCH resource allocations can be associated with different spatial filters for a UE.

At 320, a pre-emption indication that indicates pre-empted resources can be received. Pre-empted resources can be resources to be punctured and/or resources to be rate matched around. According to a possible embodiment, the pre-emption indication can be a first pre-emption indication with a first bit-field size. The first pre-emption indication can be indicated in a DCI containing a second pre-emption indication with a second bit-field size different than the first bit-field size. A size of the DCI can be a multiple of a least common multiple of the first bit-field size and the second bit-field size. The multiple can be one, such that the DCI size can be equal to the least common multiple of the first bit-field size and the second bit-field size.

At 330, a determination can be made as to whether the pre-emption indication is applicable to a first PDSCH resource allocation, a second PDSCH resource allocation, both the first and the second PDSCH resource allocations, or no PDSCH resource allocation of the at least two PDSCH resource allocations. Determining whether the pre-emption indication is applicable can include determining whether the pre-emption indication is applicable based on a field in the pre-emption indication. The field can contain at least a TCI-State and/or an SSB index. Determining whether the pre-emption indication is applicable can also include determining whether the pre-emption indication is applicable to the first PDSCH resource allocation and not applicable to the second PDSCH resource allocation based on the field in the pre-emption indication.

According to a possible embodiment, determining whether the pre-emption indication is applicable can include determining whether the pre-emption indication is applicable based on the search space the pre-emption indication is received, based on the RNTI associated with the pre-emption indication, and/or based on other information.

According to a possible embodiment, the first PDSCH resource allocation can allocate same resources as the second PDSCH resource allocation. The first PDSCH can include at least two spatial layers and the pre-emption indication determined to be applicable to the first PDSCH resource allocation can indicate no transmission is present for the UE in resources indicated for a proper subset of the at least two spatial layers. A spatial filter can be different from a spatial layer by using the same beam but different baseband processing and/or antenna polarization.

At 340, a first PDSCH corresponding to the first PDSCH resource allocation can be decoded based on no transmission being present for the UE in the pre-empted resources in response to determining the pre-emption indication is applicable to the first PDSCH resource allocation and not applicable to the second PDSCH resource allocation. Different PDSCH resource allocations can be associated with different spatial filters for the UE based on the first PDSCH and the second PDSCH being quasi co-located with different reference signals.

PDSCHs can be quasi co-located with different reference signals by using different beams, different TRPs, different DL RSs, different SSB indices, different TCI-States, and/or different QCL types.

According to a possible embodiment, a second PDSCH corresponding to the second PDSCH resource allocation can be decoded based on the pre-emption indication not being applicable to the second PDSCH.

According to a possible embodiment, the UE can be configured with a first pre-emption configuration and a second pre-emption configuration. Pre-emption indications associated with a first spatial filter of the different spatial filters can be monitored according to the first pre-emption configuration. Pre-emption indications associated with a second spatial filter of the different spatial filters can be monitored according to the second pre-emption configuration. At least one of the first pre-emption configuration and the second pre-emption configuration can include at least a pre-emption position index in the DCI, a monitoring periodicity of a pre-emption indication, an RNTI value corresponding to the DCI, a DCI payload size, and/or other information. For example, pre-emptions can be sent in a group common DCI, where start locations can be different, DCI monitoring periodicities for different TRPs can be different, and other aspects can be different.

According to a possible embodiment, receiving the pre-emption indication can include receiving the pre-emption indication comprising a first number (n) of bits in a DCI payload. A higher layer parameter can be received. The higher layer parameter can indicate a starting position of the pre-emption indication. The indicated starting position of the pre-emption indication in the DCI payload can be in multiples of a second number (w). The second number can be less than the first number (w<n). The second number (w) can be a second largest divisor of the first number (n) or the second number (w) can be a greatest common divisor of 14 and the first number (n).

According to a possible embodiment, the UE can be configured with first pre-emption configuration parameters. Second pre-emption configuration parameters can be determined based on the first pre-emption configuration parameters. Parameters can include starting position index, monitoring periodicity, pre-emption indication size, and other parameters. A pre-emption position index of the second pre-emption configuration is based on a pre-emption position index of the first pre-emption configuration. For example, the second pre-emption position index can be equal to the first pre-emption position index plus 1. As another example, a monitoring periodicity of a second pre-emption indication of the second pre-emption configuration can be the same as a monitoring periodicity of a first pre-emption indication of the first pre-emption configuration. As a further example, a RNTI of the second pre-emption configuration can be based on a RNTI of the first pre-emption configuration. For example, the second pre-emption configuration RNTI can be equal to the first pre-emption configuration RNTI plus an offset. The offset can be equal to 1.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 4:
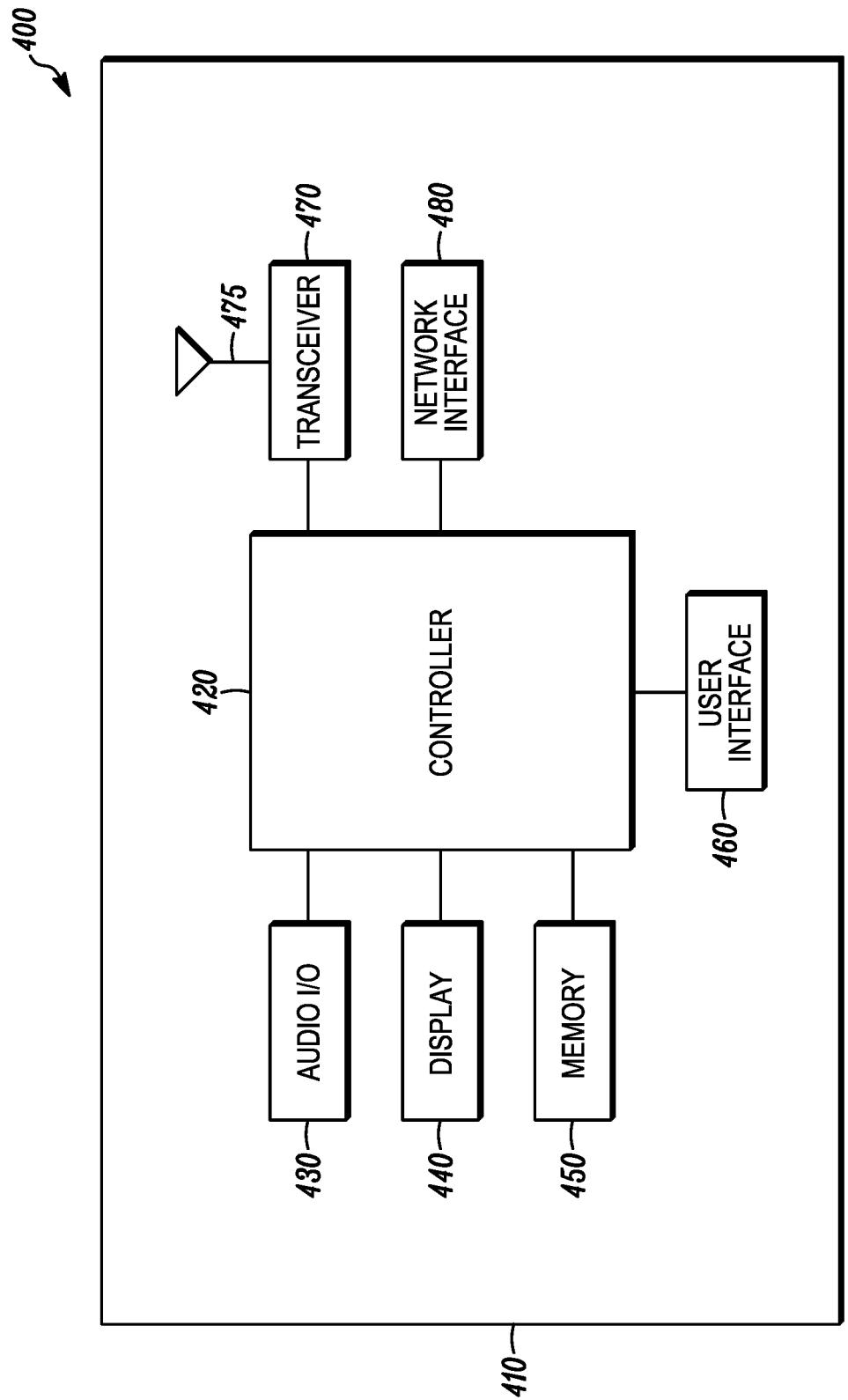
FIG. 4 is an example block diagram of an apparatus according to a possible embodiment.

FIG. 4 is an example block diagram of an apparatus 400, such as the UE 110, the network entity 120, or any other wireless communication device disclosed herein, according to a possible embodiment. The apparatus 400 can include a housing 410, a controller 420 coupled to the housing 410, audio input and output circuitry 430 coupled to the controller 420, a display 440 coupled to the controller 420, a memory 450 coupled to the controller 420, a user interface 460 coupled to the controller 420, a transceiver 470 coupled to the controller 420, at least one antenna 475 coupled to the transceiver 470, and a network interface 480 coupled to the controller 420. The apparatus 400 may not necessarily include all of the illustrated elements for different embodiments of the present disclosure. The apparatus 400 can perform the methods described in all the embodiments.

The display 440 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 470 can be one or more transceivers that can include a transmitter and/or a receiver. The audio input and output circuitry 430 can include a microphone, a speaker, a transducer, or any other audio input and output circuitry. The user interface 460 can include a keypad, a keyboard, buttons, a touch pad, a joystick, a touch screen display, another additional display, or any other device useful for providing an interface between a user and an electronic device. The network interface 480 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 450 can include a Random-Access Memory (RAM), a Read Only Memory (ROM), an optical memory, a solid-state memory, a flash memory, a removable memory, a hard drive, a cache, or any other memory that can be coupled to an apparatus.

The apparatus 400 or the controller 420 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 450, elsewhere on the apparatus 400, in cloud storage, and/or anywhere else that can store software and/or an operating system. The apparatus 400 or the controller 420 may also use hardware to implement disclosed operations. For example, the controller 420 may be any programmable processor. Furthermore, the controller 420 may perform some or all of the disclosed operations. For example, at least some operations can be performed using cloud computing and the controller 420 may perform other operations. At least some operations can also be performed computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 420 may be any controller or processor device or devices capable of operating an apparatus and implementing the disclosed embodiments. Some or all of the additional elements of the apparatus 400 can also perform some or all of the operations of the disclosed embodiments.

In operation, the apparatus 400 can perform the methods and operations of the disclosed embodiments. The transceiver 470 can transmit and receive signals, including data signals and control signals that can include respective data and control information. The controller 420 can generate and process the transmitted and received signals and information.

In operation according to a possible embodiment, the transceiver 470 can receive at least two PDSCH resource allocations. Different PDSCH resource allocations of the at least two PDSCH resource allocations can be associated with different spatial filters for the device 400. The transceiver 470 can receive a pre-emption indication that indicates pre-empted resources. The controller 420 can determine whether the pre-emption indication is applicable to a first PDSCH resource allocation, a second PDSCH resource allocation, both PDSCH resource allocations, or no PDSCH resource allocation of the at least two PDSCH resource allocations. The controller 420 can decode a first PDSCH corresponding to the first PDSCH resource allocation based on no transmission being present for the UE in the pre-empted resources in response to determining the pre-emption indication is applicable to the first PDSCH resource allocation and not applicable to the second PDSCH resource allocation.

According to a possible embodiment, the first PDSCH resource allocation can allocate same resources as the second PDSCH resource allocation. According to a possible embodiment, the first PDSCH can include at least two spatial layers and the pre-emption indication applicable to the first PDSCH resource allocation can indicate no transmission is present for the UE in resources indicated for a proper subset of the at least two spatial layers. According to a possible embodiment, the controller 420 can determine whether the pre-emption indication is applicable based on a field in the pre-emption indication. According to a possible embodiment, the controller 420 can decode a second PDSCH corresponding to the second PDSCH resource allocation based on the pre-emption indication not being applicable to the second PDSCH. According to a possible embodiment, different PDSCH resource allocations are associated with different spatial filters for the apparatus based on the first PDSCH and the second PDSCH being quasi co-located with different reference signals.

According to a possible embodiment, the transceiver 470 can receive at least two PDSCH resource allocations. Different PDSCH resource allocations of the at least two PDSCH resource allocations can be associated with different spatial filters for the device 400. The transceiver 470 can receive a pre-emption indication that indicates pre-empted resources. The controller 420 can determine whether the pre-emption indication is applicable to a first PDSCH resource allocation, a second PDSCH resource allocation, both PDSCH resource allocations, or no PDSCH resource allocation of the at least two PDSCH resource allocations. The controller 420 can decode a first PDSCH corresponding to the first PDSCH resource allocation based on no transmission being present for the UE in the pre-empted resources in response to determining the pre-emption indication is applicable to the first PDSCH resource allocation and not applicable to the second PDSCH resource allocation.

According to a possible embodiment, the first PDSCH resource allocation can allocate same resources as the second PDSCH resource allocation. According to a possible embodiment, the first PDSCH can include at least two spatial layers and the pre-emption indication applicable to the first PDSCH resource allocation can indicate no transmission is present for the UE in resources indicated for a proper subset of the at least two spatial layers. According to a possible embodiment, the controller 420 can determine whether the pre-emption indication is applicable based on a field in the pre-emption indication. According to a possible embodiment, the controller 420 can decode a second PDSCH corresponding to the second PDSCH resource allocation based on the pre-emption indication not being applicable to the second PDSCH. According to a possible embodiment, different PDSCH resource allocations are associated with different spatial filters for the apparatus based on the first PDSCH and the second PDSCH being quasi co-located with different reference signals.

At least some embodiments can provide for downlink UE multiplexing for multiple-TRP transmission. At least some embodiments can also define and interpret a received DLPI for the case of multiple TRP PDSCH transmission. At least some embodiments can also provide for determining association of DL pre-emption indication to TRP(s) in case of multi-TRP PDSCH transmissions. At least some embodiments can also provide for a size of DL pre-emption indication for multi-TRP operation being set such that the same DCI format as of DCI format 2_1 can be used. At least some embodiments can also provide for having multiple RRC configurations or a single configuration with some parameters of the configuration set differently for pre-emption indication for different TRPs.

According to a possible embodiment a method at a UE can include receiving at least two PDSCH resource allocations associated with at least two TRPs/DL RSs/SSB indices/TCI-States, for the UE. The method can include receiving a pre-emption indication indicating a set of pre-empted resources in a first monitoring period. The method can include determining that no transmission to the UE is present in the set of pre-empted resources indicated by the pre-emption indication, from the set of pre-empted resources of the last monitoring period before the first monitoring period for one of the at least two PDSCH allocations associated with one of the at least two TRPs, such as DL RS/SSB/TCI-States.

The pre-emption indication can be a first pre-emption indication with a first bit-field size. The first pre-emption indication can be indicated in a DCI containing a second pre-emption indication with a second bit-field size different than first bit-field size. The DCI size can be a multiple, including equal to that, of the least common multiple of the first bit-field size and the second bit-field size.

The UE can be configured with a first pre-emption configuration and a second pre-emption configuration. The UE can monitor pre-emption indications associated with a first TRP/DL RS/SSB/TCI-State of the at least two TRPs/DL RSs/SSBs/TCI-States according to the first pre-emption configuration. The UE can monitor pre-emption indications associated with a second TRP/DL RS/SSB/TCI state of the at least two TRPs/DL RSs/SSBs/TCI states according to the second pre-emption configuration. The pre-emption configuration can include at least one of a pre-emption position index in the DCI, monitoring periodicity of pre-emption indication, RNTI value corresponding to the DCI, and/or DCI payload size.

Pre-empting resources can mean puncturing resources. Pre-empting resources can also mean rate-matching resources.

The pre-emption indication can be a rate-matching indication. The pre-emption indication can be applicable to PDSCH transmissions until the UE receives an indication that the rate-matching indication is not any more applicable to PDSCH transmissions A higher layer parameter indicating starting position of an n-bit pre-emption indication in the DCI payload can be in multiples of w, where w<n and w can be the second largest divisor/factor of n or w can be a greatest common divisor of (14, n).

The UE can be configured with the first pre-emption configuration. The method can also include determining the second pre-emption configuration based on the first pre-emption configuration.

The pre-emption position index of the second pre-emption configuration can be based on the pre-emption position index of the first pre-emption configuration. For example, the second pre-emption position index can be equal to first pre-emption position index plus 1.

The monitoring periodicity of pre-emption indication of the second pre-emption configuration can be the same as the monitoring periodicity of pre-emption indication of the first pre-emption configuration.

The RNTI of the second pre-emption configuration can be based on the RNTI of the first pre-emption configuration. For example, the second pre-emption configuration RNTI can be equal to the first pre-emption configuration RNTI plus an offset, where the offset can be equal to one.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method at a user equipment, the method comprising:
   receiving at least two physical downlink shared channel resource allocations, where different physical downlink shared channel resource allocations of the at least two physical downlink shared channel resource allocations are associated with different spatial filters for the user equipment;
   receiving a pre-emption indication that indicates pre-empted resources;
   determining whether the pre-emption indication is applicable to a first physical downlink shared channel resource allocation, a second physical downlink shared channel resource allocation, both the first and the second physical downlink shared channel resource allocations, or no physical downlink shared channel resource allocation of the at least two physical downlink shared channel resource allocations; and
   decoding a first physical downlink shared channel corresponding to the first physical downlink shared channel resource allocation based on no transmission being present for the user equipment in the pre-empted resources in response to determining the pre-emption indication is applicable to the first physical downlink shared channel resource allocation, wherein the pre-emption indication is a first pre-emption indication with a first bit-field size, wherein the first pre-emption indication is indicated in a downlink control information containing a second pre-emption indication with a second bit-field size different than the first bit-field size, and wherein a size of the downlink control information is a multiple of a least common multiple of the first bit-field size and the second bit-field size.

2. The method according to claim 1, wherein the first physical downlink shared channel resource allocation allocates same resources as the second physical downlink shared channel resource allocation.

3. The method according to claim 1, wherein the first physical downlink shared channel comprises at least two spatial layers and the pre-emption indication determined to be applicable to the first physical downlink shared channel resource allocation indicates no transmission is present for the user equipment in resources indicated for a proper subset of the at least two spatial layers.

4. The method according to claim 1, wherein determining whether the pre-emption indication is applicable comprises determining whether the pre-emption indication is applicable based on a field in the pre-emption indication.

5. The method according to claim 4, wherein the field contains at least one selected from a transmission configuration information-state and a synchronization signal block index.

6. The method according to claim 4, wherein determining whether the pre-emption indication is applicable comprises determining whether the pre-emption indication is applicable to the first physical downlink shared channel resource allocation based on the field in the pre-emption indication.

7. The method according to claim 1, wherein determining whether the pre-emption indication is applicable comprises determining whether the pre-emption indication is applicable based on the search space the pre-emption indication is received.

8. The method according to claim 1, wherein determining whether the pre-emption indication is applicable comprises determining whether the pre-emption indication is applicable based on the RNTI associated with the pre-emption indication.

9. The method according to claim 1, further comprising decoding a second physical downlink shared channel corresponding to the second physical downlink shared channel resource allocation based on the pre-emption indication not being applicable to the second physical downlink shared channel.

10. The method according to claim 1, wherein different physical downlink shared channel resource allocations are associated with different spatial filters for the user equipment based on the first physical downlink shared channel and the second physical downlink shared channel being quasi co-located with different reference signals.

11. The method according to claim 1, wherein the at least two physical downlink shared channel resource allocations are received in at least one downlink control information.

12. The method according to claim 1, further comprising determining the pre-emption indication is applicable to the first physical downlink shared channel resource allocation.

13. The method according to claim 1,
wherein the user equipment is configured with a first pre-emption configuration and a second pre-emption configuration, wherein the method further comprises:
monitoring pre-emption indications associated with a first spatial filter of the different spatial filters according to the first pre-emption configuration; and
monitoring pre-emption indications associated with a second spatial filter of the different spatial filters according to the second pre-emption configuration, and wherein at least one of the first pre-emption configuration and the second pre-emption configuration includes at least one selected from a pre-emption position index in the downlink control information, a monitoring periodicity of a pre-emption indication, a radio network temporary identifier value corresponding to the downlink control information, and a downlink control information payload size.

14. The method according to claim 1, wherein pre-empted resources comprise at least one selected from resources to be punctured and resources to be rate matched around.

15. The method according to claim 1,
wherein receiving the pre-emption indication comprises receiving the pre-emption indication comprising a first number of bits in a downlink control information payload, wherein the method further comprises receiving a higher layer parameter indicating a starting position of the pre-emption indication, where a higher layer is higher than a physical layer, and wherein the indicated starting position of the pre-emption indication in the downlink control information payload is in multiples of a second number, where the second number is less than the first number, and where the second number is a second largest divisor of the first number or the second number is a greatest common divisor of 14 and the first number.

16. The method according to claim 1,
wherein the user equipment is configured with first pre-emption configuration parameters, and wherein the method further comprises determining second pre-emption configuration parameters based on the first pre-emption configuration parameters.

17. An apparatus comprising:
a transceiver that
receives at least two physical downlink shared channel resource allocations, where different physical downlink shared channel resource allocations of the at least two physical downlink shared channel resource allocations are associated with different spatial filters for the apparatus, and
receives a pre-emption indication that indicates pre-empted resources; and a controller coupled to the transceiver, where the controller
determines whether the pre-emption indication is applicable to a first physical downlink shared channel resource allocation, a second physical downlink shared channel resource allocation, both physical downlink shared channel resource allocations, or no physical downlink shared channel resource allocation of the at least two physical downlink shared channel resource allocations, and
decodes a first physical downlink shared channel corresponding to the first physical downlink shared channel resource allocation based on no transmission being present for the apparatus in the pre-empted resources in response to determining the pre-emption indication is applicable to the first physical downlink shared channel resource allocation, wherein the pre-emption indication is a first pre-emption indication with a first bit-field size, wherein the first pre-emption indication is indicated in a downlink control information containing a second pre-emption indication with a second bit-field size different than the first bit-field size, and wherein a size of the downlink control information is a multiple of a least common multiple of the first bit-field size and the second bit-field size.

18. The apparatus according to claim 17, wherein the first physical downlink shared channel resource allocation allocates same resources as the second physical downlink shared channel resource allocation.

19. The apparatus according to claim 17, wherein the first physical downlink shared channel comprises at least two spatial layers and the pre-emption indication applicable to the first physical downlink shared channel resource allocation indicates no transmission is present for the apparatus in resources indicated for a proper subset of the at least two spatial layers.

20. The apparatus according to claim 17, wherein the controller determines whether the pre-emption indication is applicable based on a field in the pre-emption indication.

* * * * *